(12) United States Patent
Donko et al.

(10) Patent No.: US 12,259,263 B2
(45) Date of Patent: Mar. 25, 2025

(54) OPTICAL FIBER SENSING

(71) Applicant: University of Southampton, Highfield Southampton (GB)

(72) Inventors: Andrei Donko, Highfield Southampton (GB); Ali Masoudi, Highfield Southampton (GB); Martynas Beresna, Highfield Southampton (GB); Gilberto Brambilla, Highfield Southampton (GB)

(73) Assignee: University of Southampton, Southampton (GB)

( * ) Notice: Subject to any disclaimer, the term of this patent is extended or adjusted under 35 U.S.C. 154(b) by 1008 days.

(21) Appl. No.: 16/996,373

(22) Filed: Aug. 18, 2020

(65) Prior Publication Data

US 2021/0033430 A1 Feb. 4, 2021

Related U.S. Application Data

(63) Continuation of application No. PCT/GB2019/050460, filed on Feb. 20, 2019.

(30) Foreign Application Priority Data

Feb. 20, 2018 (GB) ...................................... 1802708

(51) Int. Cl.
*G02B 6/124* (2006.01)
*G01D 5/353* (2006.01)
(Continued)

(52) U.S. Cl.
CPC ..... *G01D 5/35367* (2013.01); *G01D 5/35325* (2013.01); *G01D 5/35329* (2013.01);
(Continued)

(58) Field of Classification Search
CPC . G02B 6/124; G02B 6/12007; G02B 6/02057
See application file for complete search history.

(56) References Cited

U.S. PATENT DOCUMENTS

| | | | | |
|---|---|---|---|---|
| 4,606,605 A | * | 8/1986 | Ashkin | ................. G02B 6/105 385/11 |
| 4,649,529 A | | 3/1987 | Avicola | |

(Continued)

FOREIGN PATENT DOCUMENTS

| | | |
|---|---|---|
| EP | 3511681 A1 | 7/2019 |
| FR | 2727201 A1 | 5/1996 |

(Continued)

OTHER PUBLICATIONS

GB1802708.6, "Search Report", Aug. 17, 2018, 4 pages.
(Continued)

*Primary Examiner* — Eric Wong
(74) *Attorney, Agent, or Firm* — Haynes and Boone, LLP (57) ABSTRACT

A sensor system includes a radiation source, an optical fiber, and a detection device. The radiation source is arranged to emit pulses of radiation. The optical fiber comprises a first end and a core. The first end is arranged to receive pulses of radiation output from the radiation source such that, in use, the pulses of radiation are coupled into the fiber. The core is arranged to support propagation of the pulses of radiation along the fiber. The core includes a plurality of reflectors each comprising a portion of the core having a refractive index which is different to the refractive index of adjacent regions of the core. Reflections of a pulse of radiation from adjacent reflectors output at the first end of the fiber are resolvable from each other in the time domain. The detection device is arranged to measure radiation output from the first end of the fiber and resolve radiation reflected at different locations in the core of the fiber.

19 Claims, 4 Drawing Sheets

(51) Int. Cl.
*G01H 9/00* (2006.01)
*G02B 6/02* (2006.01)
*G02B 6/12* (2006.01)

(52) U.S. Cl.
CPC ......... *G01D 5/35361* (2013.01); *G01H 9/004* (2013.01); *G02B 6/02057* (2013.01); *G02B 6/12007* (2013.01); *G02B 6/124* (2013.01)

(56) References Cited

U.S. PATENT DOCUMENTS

| | | | |
|---|---|---|---|
| 6,681,067 B1* | 1/2004 | Kersey | G02B 6/02185 359/566 |
| 2004/0086213 A1* | 5/2004 | Ramachandran | G02F 1/3511 385/11 |
| 2007/0258674 A1 | 11/2007 | Wang et al. | |
| 2012/0321242 A1* | 12/2012 | Schade | G01D 5/35387 385/12 |
| 2013/0333476 A1* | 12/2013 | Omichi | G01H 9/004 73/655 |
| 2017/0010385 A1* | 1/2017 | Englich | G01H 9/004 |
| 2017/0343728 A1 | 11/2017 | Kremp et al. | |
| 2018/0045543 A1 | 2/2018 | Farhadiroushan et al. | |
| 2021/0148832 A1* | 5/2021 | Kvryan | G01N 21/8806 |

FOREIGN PATENT DOCUMENTS

| | | |
|---|---|---|
| GB | 2405468 A | 3/2005 |
| WO | 9631756 A1 | 10/1996 |
| WO | 2005085766 A2 | 9/2005 |
| WO | 2016029110 A1 | 2/2016 |
| WO | 2016142695 A1 | 9/2016 |
| WO | 2017087792 A1 | 5/2017 |
| WO | 2018042441 A1 | 3/2018 |
| WO | 2018127708 A1 | 7/2018 |
| WO | 2019162664 A1 | 8/2019 |

OTHER PUBLICATIONS

Hua, et al., "Femtosecond Laser Fabricated Multimode Fiber Sensors Interrogated by Optical-Carrier-Based Microwave Interferometry Technique for Distributed Strain Sensing", Photonic Instrumentation Engineering III, Proceedings of Society of Photographic Instrumentation Engineers, vol. 9754, Mar. 16, 2016, 6 pages.

PCT/GB2019/050460, "International Search Report and Written Opinion", May 20, 2019, 16 pages.

EP19708621.8, "European Examination Report", Sep. 2022, pp. 1-8.

* cited by examiner

OPTICAL FIBER SENSING

CROSS-REFERENCES TO RELATED APPLICATIONS

This application claims priority to and is a continuation of International Patent Application No. PCT/GB2019/050460, filed Feb. 20, 2019; which claims priority to GB Patent Application No. 1802708.6, filed Feb. 20, 2018, the entire contents of which are hereby incorporated by reference in their entirety for all purposes.

TECHNICAL FIELD

The present disclosure relates to apparatus and methods for sensing using an optical fiber. Aspects of the invention relate to a sensor system, a detection device, an optical fiber, a method of manufacture of an optical fiber and a sensing method.

BACKGROUND OF THE INVENTION

The use of optical fibers for sensing has found numerous applications in a variety of fields including construction, oil and gas, transportation, manufacturing and security. Typically, radiation is coupled into an optical fiber and transmission and/or reflection of the radiation from the fiber is measured in order to derive measurements of properties such as temperature, pressure and strain at one or more locations along the fiber. The optical fiber itself therefore functions as a sensing element and allows for remote sensing of one or more properties at locations along the optical fiber. Measurements of properties such as temperature, pressure and strain may therefore be carried out without positioning sensors at the locations for which measurements are required. This can allow measurements to be made corresponding to locations at which it may be difficult to position sensors, such as particularly remote locations and/or locations which are subjected to harsh environmental conditions.

Some optical fiber sensing techniques may allow for distributed sensing along the entire length of an optical fiber. That is, measurements may be made of one or more properties at a plurality of different locations along the optical fiber. Optical fiber sensing typically make use of one or more of a number of different optical effects in order to derive measurements at locations along the optical fiber. For example, Raman scattering, Brillouin scattering and/or Rayleigh scattering of radiation in an optical fiber may be measured and used to determine one or more properties at locations along the optical fiber.

One of the most commonly used techniques in optical fiber sensing is to measure radiation which is backscattered in an optical fiber due to Rayleigh scattering. A typical optical fiber, such as a conventional telecommunications optical fiber, is formed from amorphous materials such as silica glass. Such amorphous materials include random fluctuations in their density caused by an irregular microscopic structure. The density fluctuations cause Rayleigh scattering of radiation propagating through the fiber, a portion of which will be reflected in the core of the fiber and be output from the fiber and may be measured.

Figure 1:
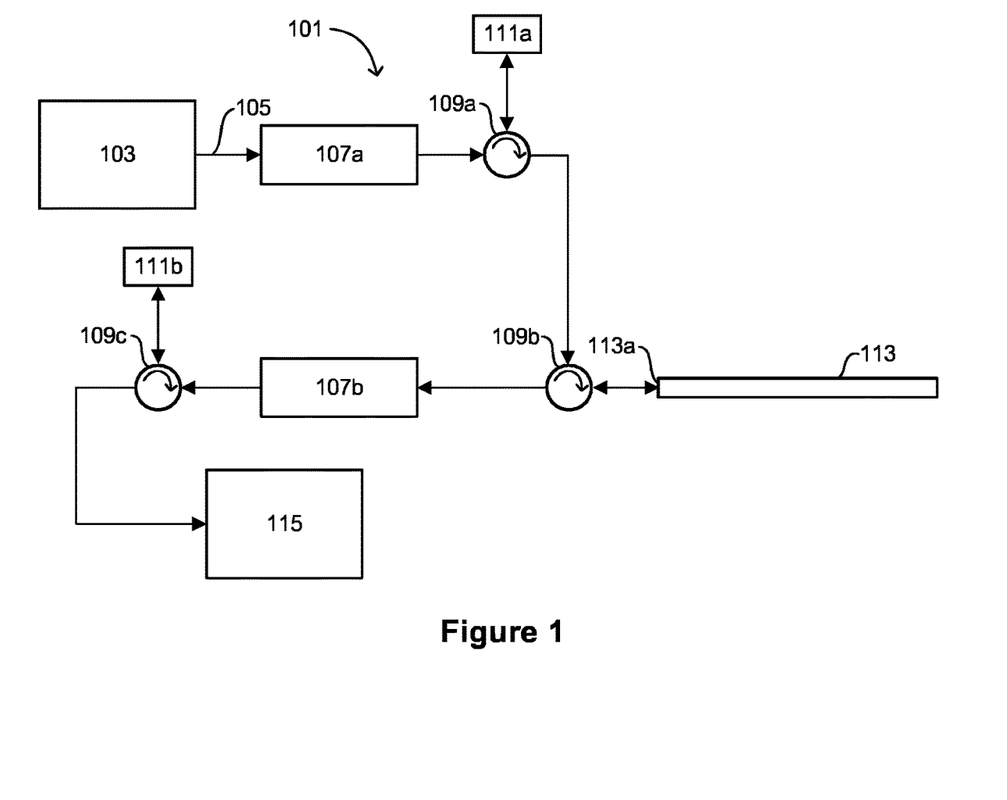
FIG. 1 is a schematic illustration of a sensing system including an optical fiber.

FIG. 1 is a schematic illustration of an example of a typical optical fiber sensing system 101 arranged to measure backscattered radiation due to Rayleigh scattering in an optical fiber. The sensing system 101 includes a laser 103, a first optical amplifier 107a, an optical fiber 113, a second optical amplifier 107b and a detection device 115. The sensing system 101 further includes a first circulator 109a, a first wavelength-dependent reflector 111a, a second circulator 109b, a third circulator 109c and a second wavelength-dependent reflector 111b.

The laser 103 emits pulses of radiation 105. The pulses of radiation 105 are amplified by the first optical amplifier 107a and directed to the first circulator 109a. The first circulator 109a directs the pulses of radiation 105 received from the first optical amplifier 107a to be incident on the first wavelength-dependent reflector 111a. Radiation which is reflected from the wavelength dependent reflector 111a returns to the first circulator 109a and is directed to the second circulator 109b.

The wavelength-dependent reflector 111a has a reflectivity which is a strong function of wavelength and acts as a spectral filter. The wavelength-dependent reflector 111a may, for example, comprise a fiber Bragg grating configured to selectively reflect radiation in a narrow wavelength band centered on a Bragg wavelength. The first circulator 109a and the first wavelength-dependent reflector 111a therefore act to filter out spectral components which fall outside of the narrow wavelength band. The spectral filtering performed by the combination of the first circulator 109a and the first wavelength-dependent reflector 111a could instead be performed, for example, by a thin-film filter or a dense wavelength demultiplexer (DWDM) filter.

The second circulator 109b directs radiation received from the first circulator 109a into a first end 113a of the optical fiber 113. The radiation is therefore coupled into the optical fiber 113 and propagates along the fiber. The optical fiber 113 may comprise a conventional telecommunications optical fiber 113, which are typically relatively inexpensive.

Radiation which is reflected out of the first end of the optical fiber 113 is received at the second circulator 109b and directed to the second optical amplifier 107b, which amplifies the reflected radiation. The reflected radiation includes a portion of the pulses of radiation 105 coupled into the fiber 113 which has undergone Rayleigh scattering in the fiber.

The amplified reflected radiation is directed, by the third circulator 109c, to be incident on the second wavelength-dependent reflector 111b. Similarly to the first wavelength dependent reflector 111a, the second wavelength-dependent reflector 111b acts as a spectral filter and only reflects radiation falling within a narrow wavelength band. For example, the second wavelength-dependent reflector 111b may be a fiber Bragg grating configured to reflect at the same Bragg wavelength as the first wavelength-dependent reflector 111a. The spectrally filtered, amplified radiation is received by the detection device 115.

The detection device 115 is typically configured to measure the amplified reflected radiation and determine one or more properties (such as temperature, strain, pressure etc.) at locations along the fiber 113, based on the measured radiation. For example, the detection device 115 may measure the intensity of radiation reflected back from different parts of the fiber 113 as a function of time, after a pulse of radiation 105 emitted by the laser 103 is coupled into the fiber 113. The time at which reflected radiation is measured at the detection device 115 is a function of the distance into the fiber 113 at which the radiation is reflected. Measuring the intensity of reflected radiation as a function of time can therefore be used to derive a given property at different locations along the length of the fiber based on the time at which reflected radiation is measured. Such techniques are commonly referred to as optical time domain reflectometry (OTDR).

The magnitude of reflected radiation which is output from an optical fiber due to Rayleigh scattering (the Rayleigh signal) is typically relatively low. For this reason, the pulses of radiation 105 emitted by the laser 103 are amplified by the first optical amplifier 107a prior to being injected into the fiber 113 and the radiation reflected out of the fiber is amplified by the second optical amplifier 107b, in order to increase the magnitude of the Rayleigh signal detected by the detection device 115. Furthermore, wavelength-dependent components such as the wavelength-dependent reflectors 111a are used to filter out radiation which does not correspond to Rayleigh scattering so as to improve the signal to noise ratio of the detected Rayleigh signal. Consequently, whilst the optical fiber 113 itself may be relatively simple and inexpensive, complex and expensive optical components (such as optical amplifiers 107a, 107b and wavelength-dependent components 111a, 111b) are typically used in order to generate a sufficiently large Rayleigh scattered signal. The relatively small magnitude of the Rayleigh scattering signal can also impose limitations on a distance range over which measurements can be made and/or a spatial resolution of the measurements.

It is in this context that the subject matter contained in the present application has been devised.

SUMMARY OF THE INVENTION

It has been found that the magnitude of radiation which is reflected in an optical fiber and which is output from an optical fiber may be significantly increased (e.g. when compared to Rayleigh scattered radiation) by inscribing reflectors into the core of an optical fiber. According to embodiments of the invention an optical fiber is provided which includes a plurality of reflectors distributed along the length of the core of the fiber. The reflectors serve to significantly increase the magnitude of radiation which is reflected out of the optical fiber and which may be measured for sensing applications. The signal to noise ratio of the reflected signal is therefore significantly increased.

According to a first aspect of the invention there is provided a sensor system comprising: a radiation source arranged to emit pulses of radiation; an optical fiber comprising: a first end arranged to receive pulses of radiation output from the radiation source such that, in use, the pulses of radiation are coupled into the fiber; and a core arranged to support propagation of the pulses of radiation along the fiber, wherein the core includes a plurality of reflectors each comprising a portion of the core having a refractive index which is different to the refractive index of adjacent regions of the core, thereby being arranged to reflect a portion of the pulses of radiation back to the first end of the fiber, and wherein the reflectors are distributed along the length of the core and sufficiently separated from each other that reflections of a pulse of radiation from adjacent reflectors output at the first end of the fiber are resolvable from each other in the time domain; and a detection device arranged to measure radiation output from the first end of the fiber and resolve radiation reflected at different locations in the core of the fiber.

According to embodiments contemplated herein there is provided a sensor system comprising: a radiation source arranged to emit pulses of radiation; an optical fiber comprising: a first end arranged to receive pulses of radiation output from the radiation source such that, in use, the pulses of radiation are coupled into the fiber; and a core arranged to support propagation of the pulses of radiation along the fiber, wherein the core includes a plurality of reflectors each comprising a portion of the core having a refractive index which is different to the refractive index of adjacent regions of the core, thereby being arranged to reflect a portion of the pulses of radiation back to the first end of the fiber, and wherein the reflectors are distributed along the length of the core and sufficiently separated from each of a plurality of adjacent reflectors that reflections of a pulse of radiation from each of a plurality of adjacent reflectors output at the first end of the fiber are resolvable from each other in the time domain; and a detection device arranged to measure radiation output from the first end of the fiber and resolve radiation reflected at different locations in the core of the fiber.

The reflectors act as preconfigured reflection sites, which advantageously increase the magnitude of radiation reflected out of the first end of the fiber and measured by the detection device. The signal to noise ratio of the radiation measure by the detection device is therefore advantageously increased. This may, for example, allow one or more optical amplification stages to be dispensed with in the sensor system so as to decrease the complexity and the expense of the sensor system.

The reflectors each comprise a portion of the core having a refractive index which is different to the refractive index of adjacent regions of the core. For example, the bulk of the core (comprising the regions of the core in between the reflectors) may have a first refractive index and the reflectors may have a second refractive index different to the first refractive index. The bulk of the core and the reflectors may comprise the same material, and the reflectors may comprise portions of the material in which the refractive index has been altered relatively to the bulk of the core.

The reflectors and the bulk of the core may comprise solid materials. For example, the entirety of the core (including the reflectors) may comprise a continuous solid material, where the reflectors comprise portions of the solid material having a different refractive index to regions of the core adjacent to the reflectors. For the purposes of this description it is expressly intended that the term "solid" includes amorphous solids such as glass.

The difference in refractive index between the reflectors and adjacent regions of the core is much greater than any naturally occurring refractive index variations in amorphous materials due to random density fluctuations caused by an irregular microscopic structure. The intensity of radiation which is reflected by the reflectors is therefore greater than the intensity of radiation which is reflected due to Rayleigh scattering in regions of the core in between the reflectors.

The reflectors may each comprise a single portion of the core having a refractive index which is different to the refractive index of adjacent regions of the core. For example, each reflector may comprise a maximum of two reflection sites at which there is a substantial change in refractive index in the core (at each edge of the reflector). In at least some embodiments, the reflectors may comprise a portion of the core having substantially the same refractive index throughout the portion of the core which is designated as a reflector. For example, a reflector may comprise a portion of the core in which the refractive index is substantially uniform throughout the portion of the core. A reflector may, for example, comprise a portion of the core having a first refractive index and may be situated adjacent to portions of the core having a second refractive index (which might for example be the refractive index of the bulk of the core). The reflectors may therefore be distinguished from a grating, which includes more than two reflection sites (and typically includes many more than two reflection sites) at which there is substantial change in the refractive index in the core.

Reference is made throughout this specification to adjacent reflectors which are sufficiently separated from each other that reflections of a pulse of radiation from adjacent reflectors and output from a fiber are resolvable from each other in the time domain. It will be appreciated that any such reference encompasses reflectors which are sufficiently separated from each of a plurality of adjacent reflectors that reflections of a pulse of radiation from each of the reflector and a plurality of adjacent reflectors are resolvable from each other in the time domain. References herein to a plurality of adjacent reflectors may encompass three or more adjacent reflectors.

The reflectors may be distributed along the length of the core and sufficiently separated from each other that reflections of a pulse of radiation from a plurality of adjacent reflectors output at the first end of the fiber are each resolvable from each other in the time domain. The plurality of adjacent reflectors may include three or more adjacent reflectors distributed along the length of the core and sufficiently separated from each other that reflections of a pulse of radiation from three or more of adjacent reflectors output at the first end of the fiber are each resolvable from each other in the time domain. That is, at least some of the reflectors may be situated in between two adjacent reflectors and may be separated sufficiently from each of the two adjacent reflectors such that reflections from the reflector and its two adjacent reflectors are each resolvable from each other in the time domain. The reflectors may include a plurality of reflectors arranged such that each reflector in the plurality of reflectors is situated between two adjacent reflectors, where the separation between a reflector and both of its adjacent reflectors is sufficient that reflections of a pulse of radiation from the reflector and both adjacent reflectors output at the first end of the fiber are resolvable from each other in the time domain.

The reflectors are sufficiently separated from each other (e.g. the separation between each of three or more adjacent reflectors) that reflections of a pulse of radiation from adjacent reflectors output at the first end of the fiber are resolvable from each other in the time domain. This allows an indication of the position of a reflector at which measured radiation is reflected from to be determined based on the time at which the radiation is detected. Whilst reflections from adjacent reflectors are resolvable from each other in the time domain, there may be some overlap, in the time domain, between a pulse reflected from adjacent reflectors.

The reflectors are separated from each other (e.g. the separation between each of three or more adjacent reflectors) by distances which are much greater than the wavelength of the radiation being reflected. The reflectors are not arranged to match the phase of reflections from adjacent reflectors. The arrangement of reflectors therefore differs from an arrangement of reflectors in a grating structure which relies on consistent constructive interference between reflections from adjacent reflectors. The reflections are thus resolvable from each other in the time domain.

The detection device may be arranged to determine, from the measured radiation output from the first end of the fiber, a relative phase of reflections of a pulse of radiation from different reflectors in the core of the fiber.

The relative phase of reflections from different reflectors provides an indication of an optical path length between the reflectors. The optical path length between different reflectors is dependent on the strain between the reflectors and may therefore be used as a measure of strain at a given position in the fiber. The relative phase of reflections from a plurality of different pairs of reflectors may be determined so as to provide a measure of the strain at a plurality of different positions along the fiber. For example, the relative phase of reflections from different sets of adjacent reflectors may be determined in order to provide a measure of the strain between different sets of adjacent reflectors.

The detection device may be further arranged to determine a change in an optical length between the different reflectors in the core of the fiber, based on a change in determined relative phases between reflections from different reflectors for a plurality of different pulses of radiation.

Changes in the optical length between different reflectors may be caused by acoustic signals such as vibrations in the fiber. Determining changes in optical lengths in the fiber occurring in between different pulses of radiation may therefore be used to resolve vibrations occurring at different locations in the fiber. This may, for example, provide an indication of the movement of people, goods, vehicles and/or machinery in proximity to the fiber or may used in applications such as monitoring pipelines such as an oil and gas pipeline.

The detection device may comprise an interferometer arranged to receive radiation output from the first end of the fiber such that the radiation forms an input to the interferometer and a radiation detector arranged to measure an output of the interferometer.

The interferometer may, for example, comprise a Mach-Zehnder interferometer such as an imbalanced Mach-Zehnder fiber interferometer. The interferometer may comprise a Michelson interferometer. The interferometer may be arranged such that the intensity of radiation detected by the radiation detector is dependent on the relative phase of reflections from different reflectors in the optical fiber. The intensity of radiation output from the interferometer as a function of time, after a pulse of radiation is input into the first end of the fiber, may be indicative of the relative phase of reflections from different sets of reflectors in the fiber.

The interferometer may comprise a first arm having a first path length and a second arm having a second path length, wherein the difference between the first path length and the second path length is approximately double a separation between adjacent reflectors in optical fiber.

Such an arrangement means that reflections from adjacent reflectors are output from the interferometer at substantially the same time and thus are caused to interfere with each other. The resulting intensity of radiation output from the interferometer is then dependent on the relative phase of the reflections from adjacent reflectors.

The separation between adjacent reflectors in the core (e.g. the separation between each of three or more adjacent reflectors) may be at least ten times greater than a wavelength of the pulses of radiation emitted from the radiation source.

In general, the separation between adjacent reflectors (e.g. the separation between each of three or more adjacent reflectors) is much greater than then wavelength of radiation being reflected and thus the arrangement of the reflectors differs from a grating structure. In some embodiments, the separation between adjacent reflectors may be at least one hundred times greater than the wavelength of the radiation being reflected.

The separation between adjacent reflectors in the core (e.g. the separation between each of three or more adjacent reflectors) may be greater than about 1 millimeter.

In some embodiments, the separation between adjacent reflectors (e.g. the separation between each of three or more adjacent reflectors) may be greater than about 1 centimeter and may even be greater than about 10 centimeters.

The separation between adjacent reflectors in the core (e.g. the separation between each of three or more adjacent reflectors) may be less than a distance travelled in the core by a pulse of radiation, emitted by the radiation source, over the duration of the pulse of radiation.

In some embodiments, the separation between adjacent reflectors (e.g. the separation between each of three or more adjacent reflectors) may be sufficiently large that there is no overlap in the time domain between reflections of a pulse of radiation from adjacent reflectors. However, in some embodiments it may be desirable to provide a shorter separation between reflectors so as to allow for higher resolution measurements in the fiber. Additionally or alternatively it may be desirable to use radiation pulses having a longer pulse duration since this increases the magnitude of the reflected signal. In such embodiments, the separation between adjacent reflectors may approach or be less than a distance travelled in the core by a pulse of radiation over the duration of the pulse. However, reflections from adjacent reflectors remain resolvable from each other in the time domain.

The separation between adjacent reflectors in the core (e.g. the separation between each of three or more adjacent reflectors) may be less than half of the distance travelled in the core by a pulse of radiation, emitted by the radiation source, over the duration of the pulses of radiation.

When the separation between adjacent reflectors is less than half of a distance travelled by a pulse over the duration of the pulse, then there will be some overlap between reflections from adjacent reflectors, in the time domain as they arrive at the detection device. However, reflections from adjacent reflectors remain resolvable from each other in the time domain even if there is some overlap between the reflections. For example, intensity peaks in the reflected radiation associated with reflection from adjacent reflectors may still be resolvable from each other.

In some embodiments the separation between adjacent reflectors may be such that there is some overlap, in the time domain, between reflections of a pulse from more than two reflectors. For example, the separation between adjacent reflectors may be less than a quarter of the distance travelled in the core by a pulse of radiation over the duration of the pulse. In such embodiments there will be some overlap in the domain between reflections from three or more reflectors. However, reflections from adjacent reflectors remain resolvable from each other in the time domain.

The optical fiber may be configured such that radiation which is reflected at the reflectors and output from the first end of the fiber has an intensity which is at least ten times greater than an intensity of radiation which undergoes Rayleigh scattering in the remainder of the core and which is output from the first end of the fiber.

In some embodiments, the radiation which is reflected at the reflectors and output from the first end of the fiber has an intensity which is at least one hundred time greater than an intensity of radiation which undergoes Rayleigh scattering in the remainder of the core and which is output from the first end of the fiber. In some embodiments, the intensity of the output from the first end of the fiber due to reflections at the reflectors may be at least a thousand times greater than the intensity of the output from the first end of the fiber due to Rayleigh scattering in the remainder of the core.

A difference between the refractive index of a portion of the core which forms a reflector and the refractive index of adjacent portions of the core may be less than about 0.03.

Whilst it may be desirable to increase the intensity of radiation which is reflected back out of the first end of the fiber, it may also be desirable to limit transmission loss in the fiber caused by the reflectors. For example, transmission loss in the fiber may limit the signal strength of reflections from reflectors situated relatively far away from the first end of the fiber. A distance range over which measurements may be made in the fiber may therefore be limited by transmission loss in the fiber. The reflectance of the reflectors and the transmission loss caused by the reflectors is dependent at least in part on the difference in refractive index between the reflectors and adjacent regions of the core. Limiting the refractive index difference between the refractive index of the reflectors and adjacent regions of the core may limit transmission loss in the core.

In some embodiments, the difference between the refractive index of a portion of the core which forms a reflector and the refractive index of adjacent portions of the core is less than about 0.01. The different in refractive index may even be less than about 0.001

The difference in refractive index between the reflectors and adjacent regions of the core may be greater than about 0.00001.

Each of the plurality of reflectors may be arranged to reflect less than about 1% of the pulses of radiation propagating along the fiber.

As was explained above, in some situations it may be desirable to limit transmission loss in the fiber caused by reflection from the reflectors. In some embodiments, each of the plurality of reflectors may be arranged to reflect less than about 0.% of the radiation propagating along the fiber.

The reflectance of each of the reflectors may be more than about 0.00%

The plurality of reflectors may form less than about 0.1% of the length of the core of the optical fiber.

Transmission loss in the fiber is also dependent on the density per unit length of reflectors in the core. In some embodiments the plurality of reflectors may form less than about 0.05 of the length of the core of the optical fiber.

The plurality of reflectors may be arranged to attenuate pulses of radiation propagating along the fiber by less than about 100 dB per kilometer.

In some embodiments, the reflectors may be arranged to attenuate pulses of radiation propagating along the fiber by less than about 10 dB per kilometer. In some embodiments, the reflectors may be arranged to attenuate pulses of radiation propagating along the fiber by less than about 3 dB per kilometer or even by less than about 1 dB per kilometer.

The sensor system may be arranged such that the detection device measures radiation output from the first end of the fiber without amplifying the radiation output from the first end of the fiber.

Optical amplification stages may require relative complex and/or expensive components. The complexity and/or expense of a sensor system may therefore be reduced by omitting one or more optical amplification stages. It may be possible to detect radiation reflected out of the optical fiber with an acceptable signal to noise ratio without amplifying the radiation because of the increase in intensity of the reflected radiation caused by the presence of reflectors distributed along the length of the fiber.

According to a second aspect of the invention there is provided an optical fiber suitable for use in a sensor system according to the first aspect.

According to a third aspect of the invention there is provided an optical fiber comprising: a first end for receiving pulses of radiation coupled into the fiber; and a core arranged to support propagation of the pulses of radiation along the fiber, wherein the core includes a plurality of reflectors each comprising a portion of the core having a refractive index which is different to the refractive index of adjacent regions of the core, thereby being arranged to reflect a portion of the pulses of radiation back to the first end of the fiber, and wherein the reflectors are distributed along the length of the core and sufficiently separated from each other that reflections of a pulse of radiation from adjacent reflectors received at the first end of the fiber are resolvable from each other in the time domain.

The reflectors may each comprise a single portion of the core having a refractive index which is different to the refractive index of adjacent regions of the core. For example, each reflector may comprise a maximum of two reflection sites at which there is a substantial change in refractive index in the core (at each edge of the reflector). In at least some embodiments, the reflectors may comprise a portion of the core having substantially the same refractive index throughout the portion of the core which is designated as a reflector. For example, a reflector may comprise a portion of the core in which the refractive index is substantially uniform throughout the portion of the core. A reflector may, for example, comprise a portion of the core having a first refractive index and may be situated adjacent to portions of the core having a second refractive index (which might for example be the refractive index of the bulk of the core). The reflectors may therefore be distinguished from a grating, which includes more than two reflection sites (and typically includes many more than two reflection sites) at which there is substantial change in the refractive index in the core.

The reflectors may be distributed along the length of the core and sufficiently separated from each other that reflections of a pulse of radiation from a plurality of adjacent reflectors output at the first end of the fiber are each resolvable from each other in the time domain. The plurality of adjacent reflectors may include three or more adjacent reflectors distributed along the length of the core and sufficiently separated from each other that reflections of a pulse of radiation from three or more of adjacent reflectors output at the first end of the fiber are each resolvable from each other in the time domain. That is, at least some of the reflectors may be situated in between two adjacent reflectors and may be separated sufficiently from each of the two adjacent reflectors such that reflections from the reflector and its two adjacent reflectors are each resolvable from each other in the time domain. The reflectors may include a plurality of reflectors arranged such that each reflector in the plurality of reflectors is situated between two adjacent reflectors, where the separation between a reflector and both of its adjacent reflectors is sufficient that reflections of a pulse of radiation from the reflector and both adjacent reflectors output at the first end of the fiber are resolvable from each other in the time domain.

The separation between adjacent reflectors (e.g. the separation between each of three or more adjacent reflectors) in the core may be at least ten times greater than a wavelength of the pulses of radiation coupled into the fiber.

The separation between adjacent reflectors (e.g. the separation between each of three or more adjacent reflectors) in the core may be greater than about 1 millimeter.

The separation between adjacent reflectors (e.g. the separation between each of three or more adjacent reflectors) in the core may be less than a distance travelled in the core by a pulse of radiation, coupled into the fiber, over the duration of the pulse of radiation.

The separation between adjacent reflectors (e.g. the separation between each of three or more adjacent reflectors) in the core may be less than half of the distance travelled in the core by a pulse of radiation, coupled into the fiber, over the duration of the pulses of radiation.

The optical fiber may be configured such that radiation which is reflected at the reflectors and output from the first end of the fiber has an intensity which is at least ten times greater than an intensity of radiation which undergoes Rayleigh scattering in the remainder of the core and which is output from the first end of the fiber.

A difference between the refractive index of a portion of the core which forms a reflector and the refractive index of adjacent portions of the core may be less than about 0.03.

Each of the plurality of reflectors may be arranged to reflect less than about 1% of the pulses of radiation propagating along the fiber.

The plurality of reflectors may form less than about 0.1% of the length of the core of the optical fiber.

The plurality of reflectors may be arranged to attenuate pulses of radiation propagating along the fiber by less than about 100 dB per kilometer.

According to a fourth aspect of the invention there is provided a method of manufacturing an optical fiber according to the second or third aspect, the method comprising: focusing femtosecond pulses of radiation into a core of the optical fiber so as to induce refractive index changes in the core of the fiber, wherein the induced refractive index changes form the plurality of reflectors distributed along the length of the fiber.

The femtosecond pulses of radiation may comprise infrared radiation.

The femtosecond pulses of radiation may comprise radiation in the visible spectrum.

The femtosecond pulses of radiation may comprise ultraviolet radiation.

The femtosecond pulses of radiation may comprise linearly polarized radiation.

The femtosecond pulses of radiation may comprise circularly polarized radiation.

The femtosecond pulses of radiation may have random polarization.

The femtosecond pulses of radiation may have a duration of between 10 and 1000 femtoseconds.

According to a fifth aspect of the invention there is provided a sensing method comprising: coupling pulses of radiation into a first end of an optical fiber, the optical fiber comprising a core arranged to support propagation of the pulses of radiation along the fiber, wherein the core includes a plurality of reflectors each comprising a portion of the core having a refractive index which is different to the refractive index of adjacent regions of the core, such that the reflectors each reflect a portion of the pulses of radiation back to the first end of the fiber, and wherein the reflectors are distributed along the length of the core and sufficiently separated from each other that reflections of a pulse of radiation from adjacent reflectors received at the first end of the fiber are resolvable from each other in the time domain; and measuring radiation output from the first end of the fiber and resolving radiation reflected at different locations in the core of the fiber.

The sensing method may further comprise determining, from the measured radiation output from the first end of the fiber, a relative phase of reflections of a pulse of radiation from different reflectors in the core of the fiber.

The sensing method may further comprise determining a change in an optical length between the different reflectors in the core of the fiber, based on a change in determined relative phases between reflections from different reflectors for a plurality of different pulses of radiation.

The radiation output from the first end of the fiber may be measured by a detection device comprising an interferometer arranged to receive radiation output from the first end of the fiber such that the radiation forms an input to the interferometer and a radiation detector arranged to measure an output of the interferometer.

The interferometer may comprise a first arm having a first path length and a second arm having a second path length, wherein the difference between the first path length and the second path length is approximately double a separation between adjacent reflectors in optical fiber.

The separation between adjacent reflectors (e.g. the separation between each of three or more adjacent reflectors) in the core may be at least ten times greater than a wavelength of the pulses of radiation coupled into the optical fiber.

The separation between adjacent reflectors in the core (e.g. the separation between each of three or more adjacent reflectors) may be greater than about 1 millimeter.

The separation between adjacent reflectors in the core (e.g. the separation between each of three or more adjacent reflectors) may be less than a distance travelled in the core by a pulse of radiation, coupled into the optical fiber, over the duration of the pulse of radiation.

The separation between adjacent reflectors in the core (e.g. the separation between each of three or more adjacent reflectors) may be less than half of the distance travelled in the core by a pulse of radiation, coupled into the optical fiber, over the duration of the pulses of radiation.

The optical fiber may be configured such that radiation which is reflected at the reflectors and output from the first end of the fiber has an intensity which is at least ten times greater than an intensity of radiation which undergoes Rayleigh scattering in the remainder of the core and which is output from the first end of the fiber.

A difference between the refractive index of a portion of the core which forms a reflector and the refractive index of adjacent portions of the core may be less than about 0.03.

Each of the plurality of reflectors may be arranged to reflect less than about 1% of the pulses of radiation propagating along the fiber.

The plurality of reflectors may form less than about 0.1% of the length of the core of the optical fiber.

The plurality of reflectors may be arranged to attenuate pulses of radiation propagating along the fiber by less than about 100 dB per kilometer.

The radiation output from the first end of the fiber may be measured without amplifying the radiation output from the first end of the fiber.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

BRIEF DESCRIPTION OF THE DRAWINGS

One or more embodiments of the invention are shown schematically, by way of example only, in the accompanying drawings, in which.

DETAILED DESCRIPTION OF THE INVENTION

Before particular examples of the present invention are described, it is to be understood that the present disclosure is not limited to the particular embodiments described herein. It is also to be understood that the terminology used herein is used for describing particular examples only and is not intended to limit the scope of the claims.

Figure 2:
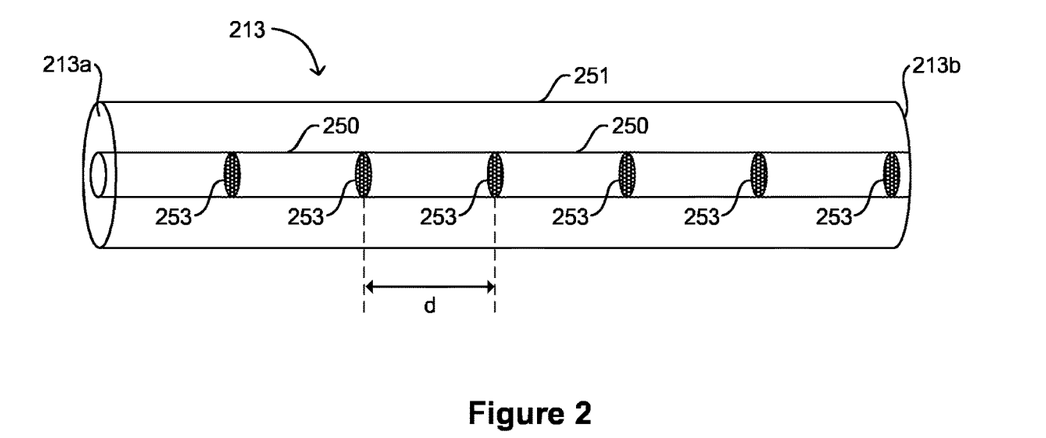
FIG. 2 is a schematic illustration of an optical fiber according to an embodiment of the invention.

FIG. 2 is a schematic depiction of an optical fiber 213 according to embodiments of the invention. The optical fiber 213 is suitable for use in a sensing system. For example, the optical fiber 213 may be used in a sensing system of the type described above with reference to FIG. 1, where the optical fiber 113 described above is replaced with an optical fiber 213 of the type depicted in FIG. 2.

The optical fiber 213 comprises a core 250 surrounded by a cladding 251. The optical fiber 213 includes a first end 213a at which radiation may be received so as to couple the radiation into the fiber 213 and a second end 213b remote from the first end 213a. The core 250 is arranged to support propagation of radiation along the fiber 213 through total internal reflections at the boundary between the core 250 and the cladding 251. The optical fiber may be constructed from typical materials such as silica (e.g. silica glass), silicate glass, compound glass and/or polymer materials. The optical fiber 213 may be a single mode fiber or may be a multimode fiber. In some embodiments, the optical fiber 213 may include multiple cores 250.

The optical fiber 213 may be arranged to support propagation of radiation across any suitable wavelength range. For example, in some embodiments the optical fiber 213 may be arranged to support propagation of radiation having a wavelength in the region of about 1550 nm. In other embodiments the optical fiber 213 may be arranged to support propagation of radiation having other wavelengths.

The core 250 includes a plurality of reflectors 253 distributed along the length of the core 253. The reflectors 253 each comprise a portion of the core 250 having a refractive index which is different to the refractive index of adjacent regions of the core 250. For example, the bulk of the core 250 (comprising the regions of the core in between the reflectors 253) may have a first refractive index and the reflectors 253 may have a second refractive index different to the first refractive index. The bulk of the core 250 and the reflectors 253 may comprise the same material, and the reflectors 253 may comprise portions of the material in which the refractive index has been altered relatively to the bulk of the core 250. For example, the entire core 250 may comprise silica glass and the reflectors 253 may comprise portions of silica glass with a different refractive index to the remainder of the core 250.

The reflectors 253 may each comprise a single portion of the core 250 having a refractive index which is different to the refractive index of adjacent regions of the core 250. For example, each reflector may comprise a maximum of two reflection sites at which there is a substantial change in refractive index in the core (at each edge of the reflector). In at least some embodiments, the reflectors 253 may comprise a portion of the core 250 having substantially the same refractive index throughout the portion of the core 250 which is designated as a reflector 253. For example, a reflector may comprise a portion of the core 250 in which the refractive index is substantially uniform throughout the portion of the core 250. A reflector 253 may, for example, comprise a portion of the core 250 having a first refractive index and may be situated adjacent to (e.g. encased by on at least two sides) portions of the core 250 having a second refractive index (which might for example be the refractive index of the bulk of the core). The reflectors 253 may therefore be distinguished from a grating, which includes more than two reflection sites (and typically includes many more than two reflection sites) at which there is substantial change in the refractive index in the core.

In general, both the reflectors 253 and the bulk of the core 250 may comprise solid materials. For example, the entirety of the core (including the reflectors 253) may comprise a continuous solid material (such as silica glass), where the reflectors 253 comprise portions of the solid material having a different refractive index to regions of the core 250 adjacent to the reflectors. For the purposes of this description it is expressly intended that the term "solid" includes amorphous solids such as glass.

In some embodiments, the reflectors 253 may occupy the entire cross-section of core 250. For example, the diameter of the regions of the core 250 corresponding to the reflectors 253 may be substantially the same as the diameter of the core 250. In other embodiments, the reflectors 253 may only occupy a portion of the cross-section of the core 250. That is, the diameter of the reflectors 253 may be smaller than the diameter of the core 250. For example, the reflectors 253 may form a central portion of a cross-section of the core 253. In some embodiments, the reflectors 253 may extend into the cladding 251. For example, the reflectors 253 may comprises the entire cross-section of a portion of the core 250 and may also extend into surrounding regions of the cladding 251.

In the embodiment shown in FIG. 2, the optical fiber 213 includes six reflectors each separated from each other by a distance d. It will be appreciated that an optical fiber according to embodiments of the invention may include any number of reflectors 253 and may, for example, include many more reflectors 253 than the six reflectors depicted in FIG. 2 and may be significantly longer than depicted in FIG. 2. In some embodiments, the separation of reflectors 253 in the fiber 213 may be periodic. That is, each of the reflectors 253 may be separated from adjacent reflectors 253 may substantially the same separation distance d. In other embodiments a separation distance between adjacent reflectors may be different at different locations along the fiber 213.

As was explained above, the reflectors 253 each comprise a region of the core 250 having a refractive index which is different to the refractive index of adjacent regions of the core 250. A portion of radiation propagating through the core 250 is therefore reflected at each of the reflectors 253.

The difference in refractive index between the reflectors 253 and adjacent regions of the core 250 is much greater than any naturally occurring refractive index variations in amorphous materials due to random density fluctuations caused by an irregular microscopic structure. The intensity of radiation which is reflected by the reflectors 250 is therefore greater than the intensity of radiation which is reflected due to Rayleigh scattering in regions of the core 250 in between the reflectors 253 (i.e. the bulk of the core 250). For example, the reflectors 253 may be configured such that radiation which is reflected at the reflectors 253 and output from the first end 213a of the fiber 213 has an intensity which is at least ten times greater than an intensity of radiation which is Rayleigh scattered in the remainder of the core and which is output from the first end 213a of the fiber 213. In some embodiments, the radiation output from the first end 213a of the core 213 due to reflection at the reflectors 253 may have an intensity which is 100 times or more greater than the intensity of radiation output from the first end 213a of the core 213 due to Rayleigh scattering in the remainder of the core 213 (i.e. portions of the core 213 in between the reflectors 253).

The reflectivity of the reflectors 253 depends at least in part on the difference in refractive index between the reflectors 253 and the bulk of the core 250. The difference in refractive index between portions of the core 250 which form the reflectors 253 and portions of the core adjacent to the reflectors 253 may, for example, be greater than about 0.00001 (and may be greater than about 0.00001). The reflectivity of each reflector 253 may, for example, be greater than about 0.001%.

Whilst it may be desirable to increase the intensity of radiation reflected in the fiber 213 (e.g. compared to the intensity of Rayleigh scattered radiation), increasing the reflectivity in the fiber also increases the propagation loss of the fiber 213. That is, increasing an amount of radiation reflected in the optical fiber 213 also serves to decrease an amount of radiation transmitted along the fiber 213 and thus increases transmission loss in the fiber.

Increasing transmission loss in the fiber may decrease a distance range over which measurements may be made in the optical fiber 213. That is, a distance into the optical fiber 213 (from the first end 213a of the optical fiber 213) from which reflections may be measured, decreases with increasing transmission loss in the fiber 213. In at least some embodiments the reflectors 253 may therefore be arranged to cause only relatively small transmission losses in the optical fiber 213.

In some embodiments, the reflectors 253 may be arranged to attenuate pulses of radiation propagating along the fiber 213 by less than about 100 decibels (dB) per kilometer. In some embodiments, the attenuation may be arranged to attenuate pulses of radiation by less than about 10 dB per kilometer. The attenuation may be less than about 3 dB per kilometer and may even be less than about 1 dB per kilometer.

The transmission loss caused by the reflectors 253 is dependent at least on the number of reflectors 253 per unit length in the fiber and the reflectivity of the reflectors 253. In some embodiments, a difference between the refractive index of portions of the core 250 which form the reflectors 253 and adjacent portions of the core may be less than about 0.03. In some embodiments, the refractive index difference may be less than about 0.01 and be, for example, be of the order of 0.001 or less.

In some embodiments, each of the plurality of reflectors 253 may be arranged to reflect less than about 1% of the pulses of radiation propagating through the fiber. In some embodiments, the reflectivity of each of the reflectors 253 may be even less and may, for example, be less than about 0.1%.

In general, the reflectors 253 may form a relatively small portion of the length of the core 250. For example, the reflectors 253 may form less than about 0.1% of the length of the core 250 or even less than about 0.05% of the length of the core 250.

The refractive index, reflectivity and/or number of reflectors 253 (or density of reflectors) per unit length may be selected according different applications of the optical fiber 213. For example, if sensing over a long length of optical fiber is desired than the reflectors 253 may be arranged to cause relatively low levels of transmission loss in the fiber 213. However, if a large reflected signal is desired and/or a small spatial resolution of measurements in the fiber is desired then an arrangement of reflectors 253 may be used which causes higher transmission losses in the fiber.

In some embodiments, the difference in refractive index between a reflector 253 and adjacent regions of the core 250 may be different for different reflectors 253. Different reflectors 253 located at different positions in the fiber 213 may therefore have a different reflectivity. For example, in some embodiments at least one reflector 253 positioned relatively close to the first end of the fiber 213 may have a reflectivity which is less than the reflectivity of at least one reflector 253 positioned at a greater distance from the first end of the fiber 213. The reflectors 253 may be arranged such that the reflectivity of at least some of the reflectors 253 increases with increasing distance from the first end 213a of the fiber 213.

Figure 3:
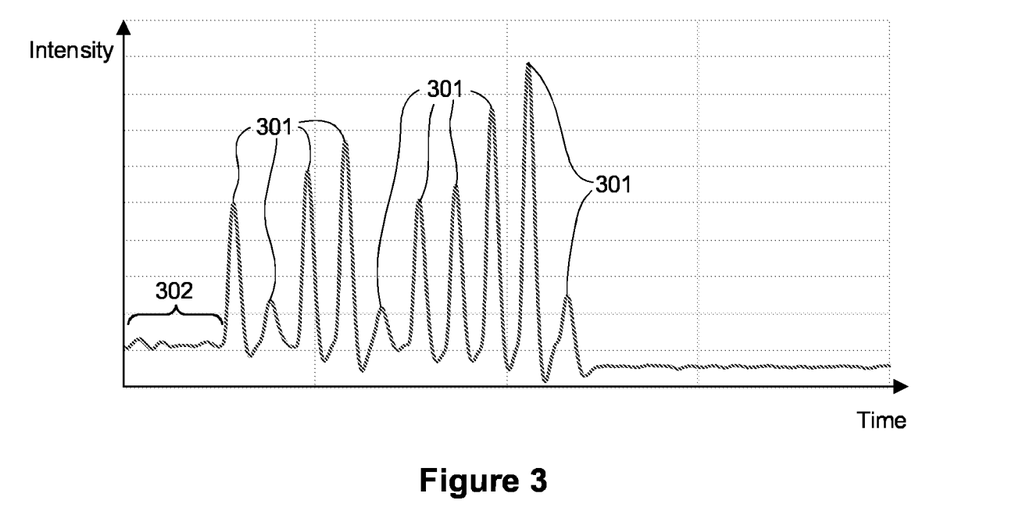
FIG. 3 is a schematic representation of the intensity of reflections of a pulse of radiation from an optical fiber according to an embodiment of the invention.

FIG. 3 is schematic representation of the intensity of radiation output from a first end 213a of an optical fiber 213 according to an embodiment of the invention as a function of time. The data represented in FIG. 3 was acquired using a sensing system of the type described above with reference to FIG. 1 except that the optical fiber 113 shown in FIG. 1 is replaced with an optical fiber 213 of the type described above with reference to FIG. 2. That is, an optical fiber 213 is used which comprises a core 250 including a plurality of reflectors 253 distributed along the core and each comprising a portion of the core 250 having a refractive index which is different to the refractive index of adjacent regions of the core 250.

The data represented in FIG. 3, represents a measurement of the reflection of radiation out of the first end 213a of the optical fiber 213 as a function of time after a pulse of radiation is coupled into the fiber 213 (by inputting the radiation into the first end 213a of the fiber 213). The time period shown in FIG. 3 represents a time period during which reflections of a single pulse of radiation input to the fiber 213 is output from the first end 213a of the fiber 213 and measured. As can be seen in FIG. 3, there are a number of large peaks 301 in the reflected intensity occurring at different times. The peaks 301 shown in FIG. 3 represent reflections of the input pulse of radiation from different reflectors 253 located at different positions along the length of the fiber 213. As will be described in further detail below, the peaks 301 in the reflected intensity as a function of time may be used to derive one or more properties at the locations of the reflectors 253 corresponding to the intensity peaks.

Also shown in FIG. 3 is a time period 302 during which relatively small fluctuations occur in the reflected intensity as a function of time. These intensity fluctuations are caused by Rayleigh scattering of the input pulse of radiation at a region of the fiber 213 which does not include reflectors 253. As is clear from FIG. 3, the magnitude of the reflected signal corresponding to Rayleigh scattering is much smaller than the magnitude of the signal reflected by the reflectors 253. The reflectors 253 therefore serve to significantly increase the signal to noise ratio of the measured reflections.

Since radiation reflected from different reflectors 253 in the fiber 213 propagates for different distances before being output at the first end 213a of the fiber 213, radiation reflected from different reflectors 213 is detected at different times. Each of the intensity peaks 301 shown in FIG. 3 therefore represents radiation reflected from different reflectors 253 in the optical fiber 213 and having undergone different propagation distances in the fiber 213 before being detected. That is, reflections of the input pulse of radiation from adjacent reflectors 253 in the fiber 213 are resolvable from each other in the time domain.

The separation in the time domain between reflections from adjacent reflectors 253 in the fiber is dependent on a separation d between adjacent reflectors 253 (as labelled in FIG. 2). According to various embodiments of the invention, the separation d between adjacent reflectors is sufficiently large that reflections of the same pulse of radiation from adjacent reflectors 253 received at the first end 213a of the fiber 213 are resolvable from each other in the time domain (as illustrated in the representation shown in FIG. 3). In this respect the arrangement of reflectors 253 in the fiber 213 is different to a grating structure (such as a fiber Bragg grating).

In a grating structure, a separation between adjacent reflectors in the grating is of the order of the wavelength of the radiation being reflected and the reflectors are arranged to provide phase matching between reflections from adjacent reflectors. Consequently, reflections from adjacent reflectors in a grating structure, constructively interfere with each other. In contrast to a grating structure, optical fibers 213 are contemplated herein in which reflectors 253 in the core 250 of the fiber 213 are separated from each by a distance much greater than the wavelength of the radiation being reflected. Unlike in a grating structure, the reflectors 253 are not arranged to provide phase-matching between reflections from adjacent reflectors 253 and thus the arrangement of the reflectors 253 does not rely on consistent constructive interference between reflections from adjacent reflectors 253.

In some embodiments, a separation distance d between adjacent reflectors 253 is at least ten times greater than the wavelength of the pulses of radiation input into the fiber 213. In some embodiments, a separation distance d between adjacent reflectors 253 is greater than about 1 millimeter. In some embodiments, a separation distance d between adjacent reflectors 253 is greater than about 1 centimeter. The separation d between adjacent reflectors 253 may be selected according to a desired spatial resolution of measurements in the optical fiber 213.

Reference is made throughout this specification to adjacent reflectors which are sufficiently separated from each other that reflections of a pulse of radiation from adjacent reflectors and output from a fiber are resolvable from each other in the time domain. It will be appreciated that any such reference encompasses reflectors which are sufficiently separated from each of a plurality of adjacent reflectors that reflections of a pulse of radiation from each of the reflector and a plurality of adjacent reflectors are resolvable from each other in the time domain.

For example, the reflectors 253 may be sufficiently separated from each other that reflections of a pulse of radiation from a plurality of adjacent reflectors output from the fiber 213 are each resolvable from each other in the time domain. The plurality of adjacent reflectors 253 may include three or more adjacent reflectors 253 distributed along the length of the core 250 and sufficiently separated from each other that reflections of a pulse of radiation from three or more of adjacent reflectors output at the first end of the fiber 213 are each resolvable from each other in the time domain. That is, at least some of the reflectors 253 may be situated in between two adjacent reflectors and may be separated sufficiently from each of the two adjacent reflectors 253 such that reflections from the reflector and its two adjacent reflectors 253 are each resolvable from each other in the time domain. The reflectors 253 may include a plurality of reflectors arranged such that each reflector in the plurality of reflectors is situated between two adjacent reflectors 253, where the separation between a reflector and both of its adjacent reflectors is sufficient that reflections of a pulse of radiation from the reflector 253 and both adjacent reflectors output at the first end of the fiber 213 are resolvable from each other in the time domain.

Figure 4:
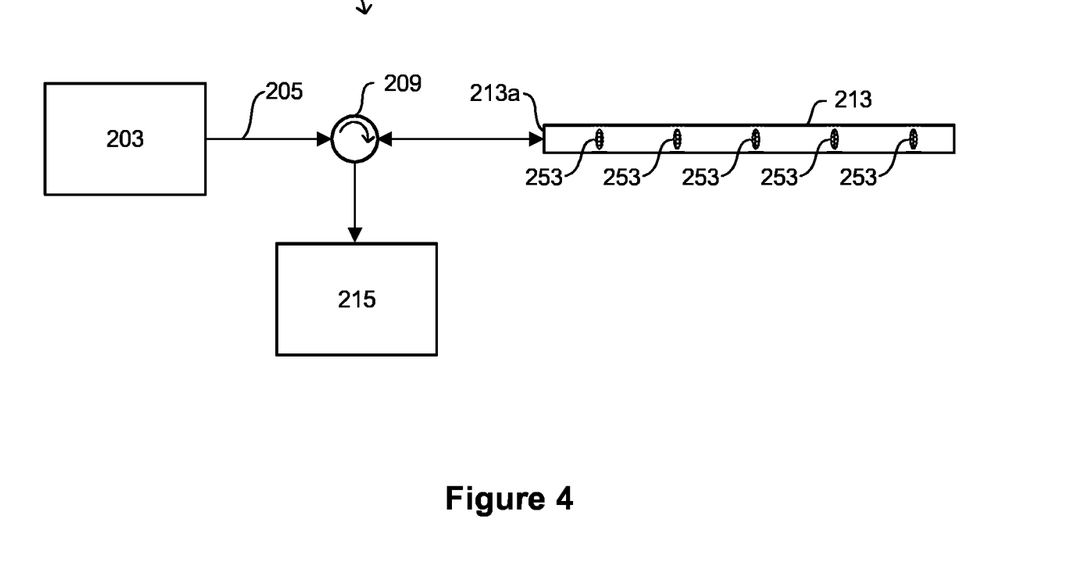
FIG. 4 is a schematic illustration of a sensing system according to an embodiment of the invention.

As was explained above, with reference to FIG. 3, the inclusion of reflectors 253 in the optical fiber 213 significantly increases the magnitude of a reflected signal output from the optical fiber (for example, when compared to reflections due to Rayleigh scattering in the fiber). In some embodiments, the magnitude of reflections from the reflectors 253 may be sufficiently large that one or more optical amplification processes may be dispensed with in a sensing system. FIG. 4 is a schematic illustration of a sensing system 201 according to an embodiment of the invention. The sensing system 201 shown in FIG. 4 is similar to the sensing system 101 shown in FIG. 1 except that the optical amplifiers 107a, 107b and wavelength-dependent reflectors 111a, 111b are dispensed with and an optical fiber 213 including a plurality of reflectors 253 is used.

The sensing system 201 comprises a radiation source 203, an optical fiber 213 including a plurality of reflectors 253 and a detection device 215. In the embodiment shown in FIG. 4, the sensing system 201 further comprises a circulator 209 arranged to direct radiation received from the radiation source 203 into a first end 213a of the fiber 213 and direct radiation output from the first end 213a of the fiber to the detection device 215.

The radiation source 203 is arranged to emit pulses of radiation 205. The radiation source 203 may, for example, comprise a pulsed laser. The pulse length and repetition rate of radiation pulses emitted from the radiation source 203 may be configured such that each pulse of radiation has sufficient time to propagate along the entire length of the fiber 213 and back again before a subsequent pulse of radiation is input into the first end 213a of the fiber 213. This allows the reflections of different pules of radiation to be resolved from each other in the time domain regardless of the location in the fiber at which the radiation is reflected. In some embodiments, the pulses of radiation emitted by the radiation source 205 may have a pulse length of the order of about a nanosecond.

The optical fiber is arranged to receive pulses of radiation 205 output from the radiation source 203 such that the pulses of radiation 205 are coupled into the optical fiber 213. The optical fiber 213 is an optical fiber of the type described above with reference to FIG. 2. That is, the optical fiber 213 comprises a core 250 including a plurality of reflectors 253 distributed along the length of the core 250. The reflectors 253 each comprise a portion of the core 250 having a refractive index which is different to the refractive index of regions of the core 250 adjacent to the reflectors 253 such that a portion of the radiation propagating along the fiber is reflected at the reflectors 253. The reflectors 253 are sufficiently separated from each other, that reflections of a single pulse of radiation from adjacent reflectors 253 output from the first end 213a of the fiber 213 are resolvable from each other in the time domain. The detection device 215 is arranged to measure radiation output from the first end 213a of the fiber 213 and resolve, in the time domain, radiation reflected at different locations in the fiber (e.g. from different reflectors 253). The detection device 215 may determine a location in the fiber 213 at which radiation is reflected based upon the time at which the reflected radiation is detected at the detection device 215.

Figure 5:
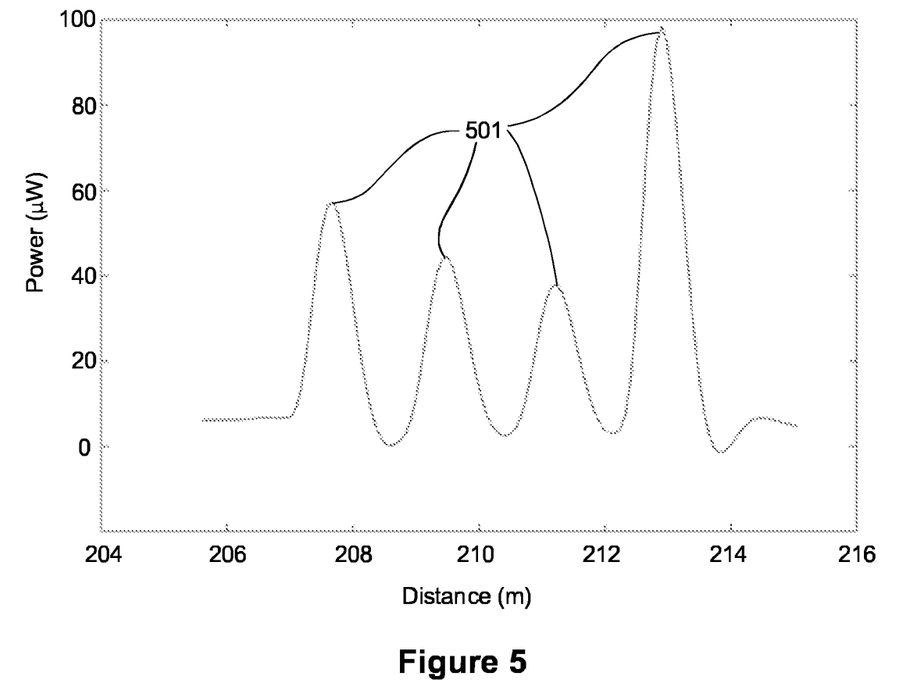
FIG. 5 is a schematic representation of the power of reflections of a pulse of radiation from an optical fiber according to an embodiment of the invention.

FIG. 5 is a schematic representation of the power of radiation output from the first end 213a of the optical fiber 213, as measured by the detection device 215, following input of a single pulse of radiation into the fiber 213. That is, the detected radiation shown in FIG. 5 corresponds to reflection of a single pulse of radiation in the fiber 213. The power of reflected radiation is shown in FIG. 5 as a function of a distance into the fiber 213 from which the detected radiation is reflected. The distance may correspond to the distance from the first end 213a of the fiber 213. The distance at which the detected radiation is reflected may be determined from the time at which the reflected radiation is detected.

In the sensing system shown in FIG. 4 the detection device 215 measures radiation output from the first end 213a of the fiber 213 without first amplifying the radiation. As can be seen in FIG. 5, even without amplification, peaks 501 corresponding to reflection from different reflectors 253 can clearly be seen in the reflected signal. The presence of reflectors 253 in the optical fiber 213 thus serves to increase the magnitude of the reflected signal (when compared to the Rayleigh scattered signal) to a sufficient extent that amplification of the radiation may not be required. The optical amplifiers 107a, 107b of the sensing system shown in FIG. 1 may therefore be dispensed with. Furthermore, the increase in reflected signal from the reflectors 253 may mean that the signal to noise ratio is sufficiently high that spectral filtering of the radiation is not required. The wavelength-dependent reflectors 111a, 111b along with the first 109a and third 111b circulators of the sensing system of FIG. 1 may therefore be dispensed with.

As was explained above, including reflectors 253 in an optical fiber 213 may allow complex and expensive optical components, such as optical amplifiers and/or wavelength dependent components to be dispensed with. Consequently, sensing systems 201 according to embodiments of the invention may be significantly less complex and expensive than sensing systems in which optical amplification and/or spectral filtering is used (such as the sensing system 101 shown in FIG. 1).

Furthermore, detecting reflected radiation without first amplifying the radiation (as shown in the embodiment of FIG. 4) may serve to increase the signal to noise ratio of the detected signal. For example, comparing the measurements shown in FIG. 5 with those shown in FIG. 4, it can be seen that the measurements shown in FIG. 5 appear to be significantly less noisy than those shown in FIG. 4. Optical amplification processes serve to amplify noise in a measured signal and may in some circumstances introduce additional noise. A sensing system 201 according to an embodiment of the invention in which reflected radiation is measured without amplifying the radiation may therefore improve the signal to noise radiation of the measured signal.

Whilst embodiments are contemplated herein in which reflections from an optical fiber 213 are detected without being amplified, in some embodiments optical amplification stages may still be included in a sensing system. For example, optical amplification may be used to increase a distance range along the fiber over which measurements may be made.

In some embodiments, the detection device 215 may be arranged to determine a relative phase of reflections of a pulse of radiation from different reflectors 253 in the core 250. The relative phase of the reflections from different reflectors 253 is indicative of an optical path length between the reflectors 253. Changes in the determined relative phase of reflections from different reflectors 253 may be used to determine a change in optical length between the different reflectors 253. For example, a first relative phase of reflections of a first pulse of radiation from a first reflector and a second reflector may be measured. Subsequently, a second relative phase of reflections of a second pulse of radiation from the first reflector and the second reflector may be measured. Any difference between the first measured relative phase and the second measured relative phase is indicative of a change in optical length between the first and second reflectors and may be used to determine a change in the optical length.

Changes in optical length between different reflectors is indicative of changes in strain between the reflectors. In some embodiments, detected changes in optical length between reflectors may be used to determine acoustic signals in the fiber 213. For example, vibrations of the fiber may be detected based on changes in the relative phase of reflections from different reflectors. Such a determination may, for example, be used to monitor movements of people, vehicles and/or machinery in proximity to the optical fiber 213.

In some embodiments an optical fiber 213 may be placed in proximity to or may be incorporated into an object to be monitored. For example, an optical fiber 213 may be arranged in proximity to a railway track and the sensing system 215 may be capable of monitoring the movement of trains along the railway track based on detecting vibrations in the optical fiber 213 caused by the movement of trains. Detected vibrations in proximity to a railway track may further be used to detect weakness, faults or breakages in the railway track.

In other embodiments an optical fiber 213 may be placed in proximity to a pipeline such as an oil pipeline. Detection of vibrations of the fiber 213 may be used to monitor a flow rate in the pipeline and/or may be used to detect a location of faults or leaks in the pipeline.

In some embodiments an optical fiber 213 may be incorporated into part of a vehicle to be used in crash testing. Detections of vibrations of the optical fiber during a crash test of the vehicle may be used to determine the impact of a crash on different portions of the vehicle.

The detection device 215 may comprise an interferometer and a detector arranged to measure the output of the interferometer. The interferometer may, for example, be arranged as a Mach-Zehnder interferometer, a Michelson interferometer or any other suitable form of interferometer. The interferometer may be arranged to receive the radiation output from the first end 213a of the optical fiber 213 and split the radiation into two-arms of the interferometer. The two-arms of the interferometer may have different path lengths, thereby inducing a phase difference between the radiation output from each arm of the interferometer.

The two-arms of the interferometer may be coupled together to produce an output, which is measured by the detector. The interferometer may be configured such that the output of the interferometer is a summation of radiation reflected from different reflectors 253 in the optical fiber 213. For example, the difference in path length between the two arms of the interferometer may be approximately double the path length between the different reflectors 253 in the optical fiber 213 (i.e. substantially the same as a path length from one reflector to another reflector and back again). The magnitude of the output of the interferometer is therefore dependent on the relative phases of reflections from the different reflectors 253 in the optical fiber 213.

As a pulse of radiation enters the optical fiber 213 and propagates along the fiber 213, the output of the interferometer is dependent on a relative phase of reflections from different reflectors 253 in the fiber 213. The reflectors 253 on which the output of the interferometer depends, changes with time after a pulse of radiation enters the optical fiber 213. For example, after a pulse is launched into the first end 213a of the fiber 213, reflections of the pulse from the two reflectors 253 closest to the first end 213a arrive at the detection device 215 first. As the reflections from the closest two reflectors 253 arrive at the detection device 215 and pass through the interferometer, the output of the interferometer is dependent on the relative phase of the reflections from the closest two reflectors 253. As the pulse of radiation continues to propagate into the fiber 213, reflection from the third closest reflector 253 to the first end 213a of the fiber will arrive at the detector 215. The output of the interferometer will then become dependent on the relative phase of reflections from the second and third closest reflectors 253 to the first end 213a of the fiber 213.

In this way, by measuring the output of the interferometer as a function of time (after a pulse of radiation is input into the optical fiber 213) the relative phase of reflections from each set of adjacent reflectors 253 in the fiber may be determined and resolved from each other in the time domain. Radiation reflected at different locations in the core 250 of the fiber 213 is therefore resolved by the detection device 215.

The relative phase of reflections from each set of adjacent reflectors 253 in the fiber provides an indication of the strain between each set of adjacent reflectors for each pulse of radiation input into the fiber 213. Changes in the strain between each set of adjacent reflectors 253 may be determined by tracking changes in the relative phase of reflections from adjacent reflectors 253 for different pulses of radiation input into the fiber 213.

Figure 6:
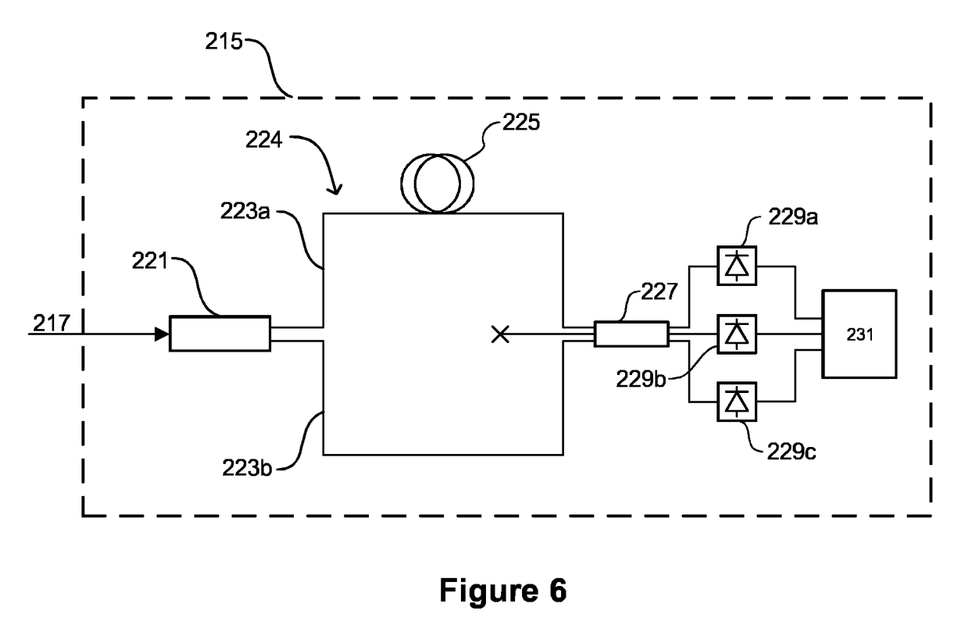
FIG. 6 is a schematic illustration of an embodiment of a detection device.

FIG. 6 is a schematic illustration of a detection device 215 according to an embodiment of the invention. The detection device 215 is arranged to receive radiation 217 output from the first end 213a of an optical fiber 213 in a sensing system 201, such as the sensing system depicted in FIG. 4. The radiation 217 is received by an optical coupler 221 which splits the radiation between a first arm 223a and a second arm 223b of an imbalanced Mach-Zehnder fiber interferometer 224.

The first arm 223a and the second arm 223b of the interferometer 224 are coupled together in a 3×3 coupler 227. The third input to the coupler 227 is left dark. The three outputs of the coupler 227 are each provided to first 229a, second 229b and third 229c radiation detectors respectively. The radiation detectors 229a, 229b, 229c provide outputs indicative of the intensity of radiation incident upon them and may for example comprise photodiodes. The outputs of the radiation detectors 229a, 229b, 229c are provided to a controller 231, which processes the output of the radiation detectors 229a, 229b, 229c. The optical paths depicted in FIG. 6 may be provided by optical fibers.

The first arm 223a of the interferometer 224 has a first path length and the second arm 223b of the interferometer 224 has a second path length. The first and second path lengths are different from each other thereby inducing a phase difference between outputs of the first and second arms 223a, 223b. For example, as is depicted in FIG. 6, the first arm 223a may include an optical delay line 225 which serves to lengthen the path length of the first arm 223a, relative to the path length of the second arm 223b, by an amount approximately equal to the path length of the optical delay line 225. The optical delay line 225 may, for example, have a path length which is approximately equal to double a separation distance d between adjacent reflectors 253 in the optical fiber 213. That is, the optical delay line 225 has a length which is approximately equal to the path length between a first reflector and a second reflector and back again. Reflections from adjacent reflectors 253 in the optical fiber 213 are therefore output from the first 223a and second 223b arms of the interferometer 224 at approximately the same time and are coupled together in the 3×3 coupler 227.

The intensity of radiation output from the three outputs of the 3×3 coupler 227, and measured by the radiation detectors 229a, 229b, 229c, is dependent on the relative phase of reflections from different reflectors 253 in the optical fiber 213. The reflectors 253 from which reflections are received at the detection device 215 and between which a relative phase is measured at the radiation detectors 229a, 229b, 229c changes with time after a pulse of radiation is input into the fiber 213. The controller 231 may be configured to determine, from the outputs of the radiation detectors 229a, 229b, 229c as a function of time, the relative phases between reflections from different reflectors through the fiber 213. The controller 231 is therefore capable of resolving radiation reflected at different locations in the core 250 of the fiber 213. The controller 231 may, for example, comprise an oscilloscope.

The controller 231 may be arranged to perform signal processing on the outputs of the detectors 229a, 229b, 229c in order to resolve a phase relationship between reflections from different reflectors 253 in the optical fiber 213. For example, the controller 231 may be arranged to perform a differential and cross-multiply phase demodulation of the outputs of the detectors 229a, 229b, 229c. Such a demodulation may allow for signal processing of the outputs of the three detectors 229a, 229b, 229c which reduces signal fading caused by thermal drift. A more detailed description of the use of a Mach-Zehnder interferometer of the type shown in FIG. 6 and appropriate signal processing of the output is presented in "A distributed optical fiber dynamic strain sensor based on phase-OTDR", Masoudi A., Belal M., Newson T. P., Measurement Science and Technology, Volume 24, Number 8, 2013 which is incorporated herein by reference in its entirety.

In other embodiments other signal processing schemes may be used. For example, in some embodiments the controller 231 may be arranged to implement a fringe counting algorithm. Details of a suitable fringe counting algorithm are presented in "High spatial resolution distributed optical fiber dynamic strain sensor with enhanced frequency and strain resolution", Masoudi A., Newson T. P., Optics Letters, Volume 42, Number 2, 2017, Pages 290-293.

As has been explained above, reflections from different reflectors 253 in an optical fiber 213, which are output from a first end 213a of the optical fiber 213 are resolvable from each other in the time domain. In some embodiments, adjacent reflectors 253 are separated from each other by a distance which is greater than half of the distance travelled in the core by a pulse of radiation, input into the fiber, over the duration of the pulse of radiation. For example, in some embodiments pulses of radiation emitted by the radiation source 203 and input into the fiber 213 may have a pulse duration of about a nanosecond. Over the nanosecond pulse duration, a pulse of radiation will travel approximately 20 cm in an optical fiber comprising a silica glass core (with a refractive index of approximately 1.5). In order for adjacent reflectors 253 to be separated from each other by more than half the distance travelled in the core by a pulse of radiation over the duration of the pulse of radiation, the reflectors may therefore be separated by at least 20 cm in such an embodiment.

In embodiments in which adjacent reflectors 253 are separated from each other by more than half the distance travelled by a pulse of radiation over the duration of the pulse, there may be substantially no overlap in the time domain between radiation reflected from different reflectors in the radiation which is output from the first end 213a of the fiber 213. That is, adjacent reflectors 253 are separated by a sufficient distance that throughout the duration of a pulse of radiation being reflected at a first reflector, substantially no radiation reflected from a second reflector, adjacent to the first reflector and situated further from the first end 213a of the fiber 213 (than the first reflector), will have had sufficient time to propagate back to the first reflector. Pulses of radiation reflected from the first and second reflectors will therefore be output from the first end 213a of the fiber 213 at different times and will not substantially overlap with each other in the time domain.

The separation between adjacent reflectors 253 defines the spatial resolution with which measurements of the fiber 213 are made. For example, if adjacent reflectors are separated by a distance of approximately 50 cm then the spatial resolution of measurements derived from reflected radiation output from the fiber (e.g. a determined strain in between adjacent reflectors) is also approximately 50 cm.

In some embodiments it may be desirable to measure properties in the fiber at a relatively high spatial resolution. In such embodiments, the separation between adjacent reflectors may be less than a distance travelled in the core 250 by a pulse of radiation over the duration of the pulse of radiation. In some embodiments, the separation between adjacent reflectors may be less than half of the distance travelled in the core 250 by a pulse of radiation over the duration of the pulse of radiation.

In such embodiments, radiation output from the first end 213a of the fiber 213 may include overlaps between radiation reflected from adjacent reflectors 253 in the fiber 213 in the time domain. However, radiation reflected from adjacent reflectors 253 and output from the first end 213a of the fiber remain resolvable from each other in the time domain. For example, peaks in the intensity of the reflected radiation attributable to reflection from adjacent reflectors are still output from the first end 213a of the fiber 213 at different times and are sufficiently separated in time to be resolvable from each other.

In embodiments in which radiation output from the first end 213a of the fiber 213 includes overlaps between radiation reflected from adjacent reflectors 253 in the time domain, the detection device 215 may be arranged to perform signal processing on measurements of the radiation output from the fiber 213 in order to resolve radiation reflected at different locations in the fiber 213. For example, the detection device 215 may be arranged to perform signal processing on measurements of the radiation output from the fiber 213 in order to resolve the relative phase between reflections from different pairs of reflectors 253 located at different positions in the fiber 213.

Providing a separation between adjacent reflectors 253 which causes overlap in the time domain between reflections from adjacent reflectors 253 may allow the spatial resolution with which measurements are made in the fiber to be improved. Additionally or alternatively, allowing spatial overlap between reflections from adjacent reflectors allows a pulse duration of pulses of radiation emitted from the radiation source 203 to be increased, for a given separation between reflectors 253. Increasing a pulse duration of the pulses of radiation causes an increase in the magnitude of the reflected signal detected by the detection unit 215 and therefore increases the signal to noise ratio of the measurements.

In general, a separation between adjacent reflectors and/or a pulse duration of pulses of radiation emitted by the radiation source 203 may be selected according to different applications of a sensing system 201. In some embodiments, the separation between adjacent reflectors may be sufficiently small such that reflections from more than two reflectors overlap with each other in the time domain. For example, reflections from three or more reflectors 253 may overlap with each other in the time domain. However, the reflectors 253 may remain sufficiently separated from each other that reflections from adjacent reflectors are resolvable from each other in the time domain.

An optical fiber 213 according to embodiments of the invention may be manufactured by modifying a conventional optical fiber to form reflectors 253 distributed along the length of the fiber 213. For example, an optical fiber may be modified by inducing changes in the refractive index of portions of the core of the fiber, where the portions of the core in which the refractive index is modified form reflectors 253.

Figure 7:
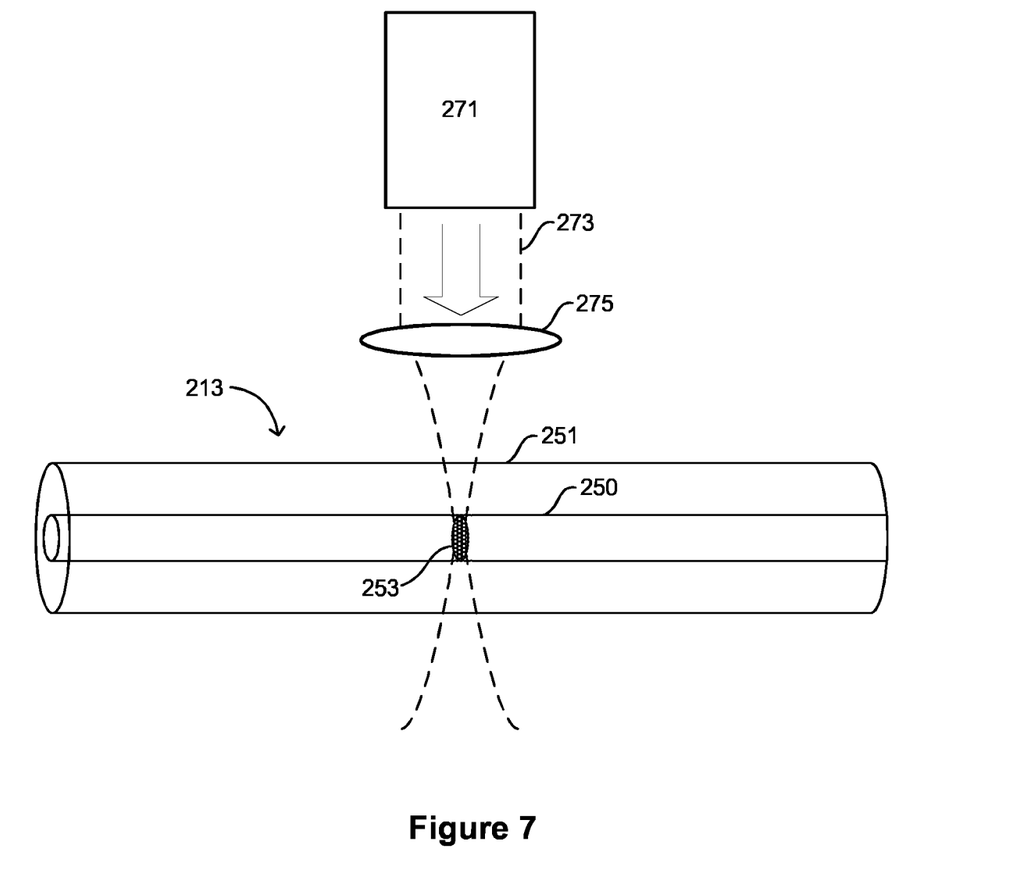
FIG. 7 is a schematic illustration of a method of manufacturing an optical fiber according to an embodiment of the invention.

FIG. 7 is a schematic illustration of a process for inducing refractive index changes in the core 250 of an optical fiber 213 so as to form a plurality of reflectors 253 distributed along the length of the fiber 213. The optical fiber 213 shown in FIG. 7 comprises a core 250 and a cladding 251. The optical fiber 213 may be formed from a conventional optical fiber such as a terrestrial telecommunications fiber, a submarine telecommunications fiber, a germanosilicate fiber, a phosphosilicate fiber, a photosensitive fiber and/or a polarization maintaining fiber. The fiber may be a single mode fiber or a multimode fiber.

Refractive index changes may be induced in the core 250 by focusing femtosecond pulses of radiation 273 into the core 250. As shown schematically in FIG. 7, a femtosecond laser 271 may be arranged to emit femtosecond pulses of radiation 273. The radiation 273 is focused into the core 250 by a lens 275. The radiation 273 induces a change in the refractive index of the core 250 so as to form a reflector 253 having a different refractive index to adjacent regions of the core 250.

For the purposes of this description, a femtosecond pulse of radiation 273 is intended to encompass any pulse of radiation have a pulse duration of between about 1 and 1000 femtoseconds. That is, a femtosecond pulse of radiation 273 has a pulse duration of between about $1 \times 10^{-15}$ and $1000 \times 10^{-15}$ seconds. In some embodiments, the pulses of radiation 273 may have a pulse duration of between about 10 and 1000 femtoseconds.

The femtosecond pulses of radiation 273 typically triggers nonlinear absorption including multi-photon absorption in the core 250. Highly excited electrons in the core 250 transfer energy to the material of the core which may serve to induce a change in the refractive index of the illuminated portion of the core 250. The short duration of a femtosecond pulse of radiation limits any heat diffusion outside of the illuminated regions of the core 250, which allows for precise localized modification of the refractive index. The magnitude of the induced change in refractive index may be controlled by controlling one or more of the pulse duration of the pulses of radiation 273, the intensity of the radiation 273 and/or the number of pulses focused into a region of the core 250. In general, the dose of radiation delivered to the core 250 is less than amount which fundamentally alters the material structure of the core and/or eradicates material from the illuminated portion of the core 250.

Multiple reflectors 253 distributed along the length of the fiber 213 may be formed by moving the fiber 213 relative to the laser 271 in order to sequentially illuminate different regions of the core 250. In some embodiments, a refractive index change may only be induced across part of the cross-section of the core 250. A reflector 253 may therefore only occupy a portion of a cross-section of the core 250. Inducing a refractive index in only part of the cross-section of the core 250 may allow a reflector 253 to be manufactured in a shorter time than inducing a refractive index change across the entire cross-section of the core 250. This may allow an optical fiber 213 to be manufactured more quickly and may in particular be useful when manufacturing a multimode fiber, which typically has a core having a larger diameter than a single mode fiber.

In different embodiments radiation 273 having different wavelengths and/or polarization states may be used to form reflectors 253. For example, in some embodiments, the femtosecond pulses of radiation 273 may comprise infrared radiation. In some embodiments, the femtosecond pulses of radiation 273 may comprise radiation in the visible spectrum. In some embodiments, the femtosecond pulses of radiation 273 may comprise ultraviolet radiation. The pulses of femtosecond pulses radiation 273 may have a random polarization state, may be linearly polarized or may be circularly polarized.

Whilst embodiments have been descried above in which reflectors 253 are formed in the core 250 of an optical fiber 213 by focusing femtosecond pulses of radiation into the core 250, in other embodiments an optical fiber 213 according to the invention may be manufacture using other methods. For example, an optical fiber 213 including a plurality of reflectors 253 distributed along the length of the core 250 may be manufacturing using UV lasers to induce changes in the refractive index of the core, by chemical diffusion into the fiber or by making mechanical modifications to the fiber.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

What is claimed is:

1. An optical fiber comprising:
a first end for receiving pulses of radiation coupled into the fiber; and
a core arranged to support propagation of the pulses of radiation along the fiber, wherein the core includes a plurality of reflectors each comprising a single portion of the core having a refractive index which is different than a refractive index of adjacent regions of the core, thereby being arranged to reflect a portion of the pulses of radiation back to the first end of the fiber, and wherein the reflectors are distributed along the length of the core and a separation between any two adjacent reflectors in the core that are arranged to reflect a portion of the pulses of radiation back to the first end of the fiber is at least 1 millimeter so that reflections of a pulse of radiation from adjacent reflectors received at the first end of the fiber are resolvable from each other in the time domain.

2. The optical fiber of claim 1, wherein the separation between any two adjacent reflectors in the core is at least ten times greater than a wavelength of the pulses of radiation coupled into the fiber.

3. The optical fiber of claim 1, wherein the separation between any two adjacent reflectors in the core is less than a distance travelled in the core by a pulse of radiation, coupled into the fiber, over the duration of the pulse of radiation.

4. The optical fiber of claim 1, wherein the separation between any two adjacent reflectors in the core is less than half of the distance travelled in the core by a pulse of radiation, coupled into the fiber, over the duration of the pulses of radiation.

5. The optical fiber of claim 1, wherein the optical fiber is configured such that radiation which is reflected at the reflectors and output from the first end of the fiber has an intensity which is at least ten times greater than an intensity of radiation which undergoes Rayleigh scattering in the remainder of the core and which is output from the first end of the fiber.

6. The optical fiber of claim 1, wherein a difference between the refractive index of a portion of the core which forms a reflector and the refractive index of adjacent portions of the core is less than about 0.03.

7. The optical fiber of claim 1, wherein each of the plurality of reflectors is arranged to reflect less than about 1% of the pulses of radiation propagating along the fiber.

8. The optical fiber of claim 1, wherein the plurality of reflectors forms less than about 0.1% of the length of the core of the optical fiber.

9. The optical fiber of claim 1, wherein the plurality of reflectors are arranged to attenuate pulses of radiation propagating along the fiber by less than about 100 dB per kilometer.

10. A method of manufacturing an optical fiber, the method comprising:
focusing femtosecond pulses of radiation into a core of the optical fiber so as to induce refractive index changes in the core of the fiber, wherein the induced refractive index changes form the plurality of reflectors distributed along the length of the fiber, wherein each of the plurality of reflectors comprises a single portion of the core having a refractive index which is different than the refractive index of adjacent regions of the core, thereby being arranged to reflect a portion of the pulses of radiation, and wherein the reflectors are distributed along the length of the core and a separation between any two adjacent reflectors in the core that are arranged to reflect a portion of the pulses of radiation back to the first end of the fiber is at least 1 millimeter so that reflections of a pulse of radiation from adjacent reflectors received at the fiber are resolvable from each other in the time domain.

11. The method of claim 10, wherein the femtosecond pulses of radiation have a duration of between 10 and 1000 femtoseconds; and
the optical fiber is constructed from one or more of silica, compound glass, and/or one or more polymer materials.

12. The optical fiber of claim 1, wherein the reflectors are configured such that reflection from the plurality of reflectors does not rely on consistent constructive interference of reflected radiation.

13. The optical fiber of claim 1, wherein the plurality of reflectors comprise broadband reflectors.

14. A sensor system comprising:
a radiation source arranged to emit pulses of radiation;
an optical fiber comprising:
a first end for receiving pulses of radiation coupled into the fiber; and
a core arranged to support propagation of the pulses of radiation along the fiber, wherein the core includes a plurality of reflectors each comprising a single portion of the core having a refractive index which is different than the refractive index of adjacent regions of the core, thereby being arranged to reflect a portion of the pulses of radiation back to the first end of the fiber, and wherein the reflectors are distributed along the length of the core and a separation between any two adjacent reflectors in the core that are arranged to reflect a portion of the pulses of radiation back to the first end of the fiber is at least 1 millimeter so that reflections of a pulse of radiation from adjacent reflectors received at the first end of the fiber are resolvable from each other in the time domain; and
a detection device arranged to measure radiation output from the first end of the fiber and resolve radiation reflected at different locations in the core of the fiber.

15. The sensor system of claim 14, wherein the detection device is arranged to determine, from the measured radiation output from the first end of the fiber, a relative phase of reflections of a pulse of radiation from different reflectors in the core of the fiber.

16. The sensor system of claim 14, wherein the detection device is further arranged to determine a change in an optical length between the different reflectors in the core of the fiber, based on a change in determined relative phases between reflections from different reflectors for a plurality of different pulses of radiation.

17. The sensor system of claim 16, wherein the detection device comprises an interferometer arranged to receive radiation output from the first end of the fiber such that the radiation forms an input to the interferometer and a radiation detector arranged to measure an output of the interferometer.

18. The sensor system of claim 17, wherein the interferometer comprises a first arm having a first path length and a second arm having a second path length, wherein the difference between the first path length and the second path length is approximately double a separation between adjacent reflectors in the optical fiber.

19. The sensor system of claim 14, wherein the sensor system is arranged such that the detection device measures radiation output from the first end of the fiber without amplifying the radiation output from the first end of the fiber.

* * * * *